United States Patent [19]

Braun et al.

[11] 4,077,340

[45] Mar. 7, 1978

[54] SEWING MACHINE HAVING WORKPIECE PREPUNCTURING DEVICE

[75] Inventors: Oskar Braun; Reinhold Dobner, both of Kaiserslautern; Knud Overlach; Ludwig Pietzsch, both of Karlsruhe, all of Germany

[73] Assignee: Pfaff Industriemaschinen G.m.b.H., Germany

[21] Appl. No.: 729,019

[22] Filed: Oct. 4, 1976

[30] Foreign Application Priority Data

Oct. 3, 1975 Germany .............................. 2544165

[51] Int. Cl.² ............................................ D05B 35/00
[52] U.S. Cl. ...................................... 112/131; 112/89; 310/322; 310/334
[58] Field of Search ................... 112/48, 85, 89, 130, 112/131, 252, 203; 310/8.2, 8.3; 83/356.2, 902, 701

[56] References Cited

U.S. PATENT DOCUMENTS

| | | | |
|---|---|---|---|
| 2,033,367 | 3/1936 | Zwicker | 112/89 |
| 3,113,225 | 12/1963 | Kleesattel et al. | 310/8.2 X |
| 3,211,115 | 10/1965 | Burillon et al. | 112/48 X |
| 3,241,508 | 3/1966 | Chezaud et al. | 112/203 |
| 3,331,220 | 7/1967 | Bastuscheck et al. | 310/8.3 X |
| 3,852,144 | 12/1974 | Parry | 83/701 X |
| 3,857,346 | 12/1974 | Dal Negro | 112/130 |
| 3,934,526 | 1/1976 | Damast | 112/252 |
| 3,948,194 | 4/1976 | Gunold | 112/131 |

*Primary Examiner*—Werner H. Schroeder
*Assistant Examiner*—Peter Nerbun
*Attorney, Agent, or Firm*—McGlew and Tuttle

[57] ABSTRACT

A workpiece prepuncturing device for use with a sewing machine having drive means for reciprocating a needle and means for feeding a workpiece into association with the needle to sew a stitch comprises a perforating tool which is located at a spaced location from the needle which is comparable to a multiple of the stitch length. The perforating tool cooperates with a counter tool which is mounted on the opposite side of the workpiece and is movable toward and away from the workpiece in timed relationship to the speed of the feed and the reciprocation of the perforating tool. The counter tool is supported in a base portion of the sewing machine by an elastic suspension, and it is in drive connection with the main shaft of the machine which operates the needle and the feed for the workpiece.

11 Claims, 7 Drawing Figures

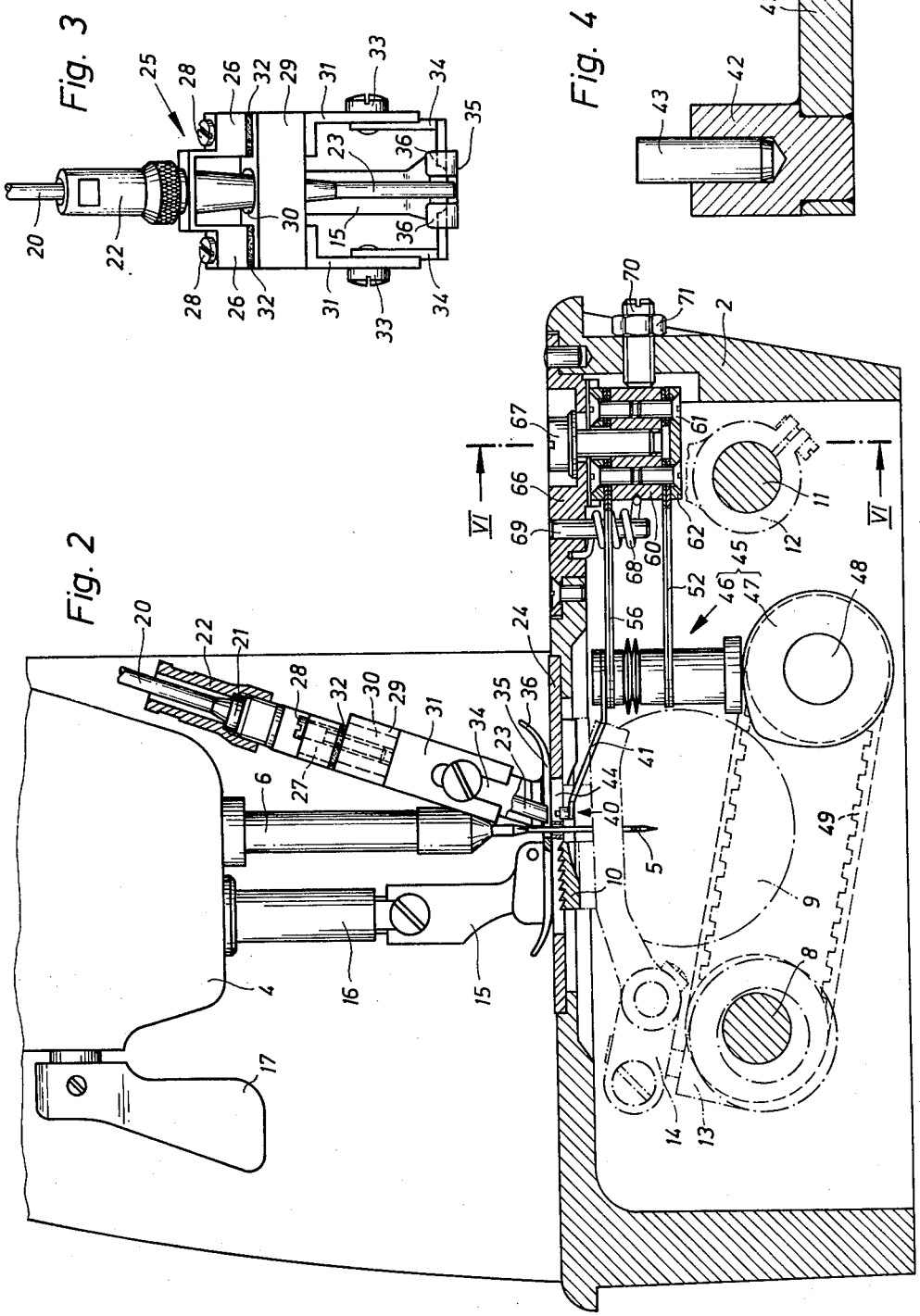
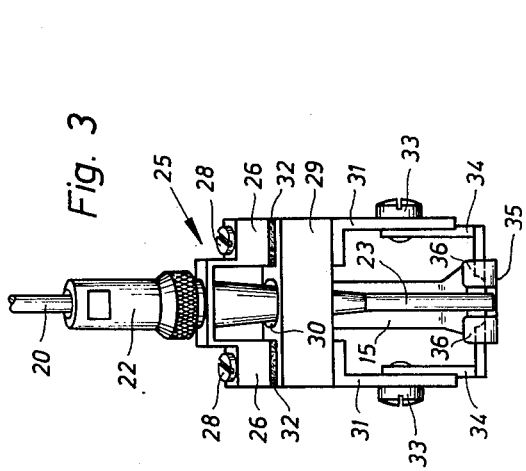
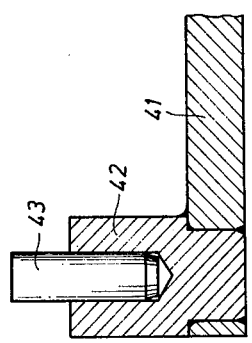

SEWING MACHINE HAVING WORKPIECE PREPUNCTURING DEVICE

BACKGROUND OF THE INVENTION

FIELD OF THE INVENTION

This invention relates, in general, to the construction of sewing machines and, in particular, to a new and useful device for prepuncturing a workpiece which is being fed to a needle.

During insertion of a sewing machine needle into the workpiece, the needle pushes the individual fabric threads apart to make room for the knotting together of the upper and lower threads to be brought into the work. The fabric threads pushed aside try to return to their starting position as soon as the needle leaves the work, so that tensions form in the work during the stitch formation, which often lead to an undesirable wrinke or curl effect. To avoid this so-called displacement curling, it is known practice to use perforating tools which are arranged in spaced relation to and before the needle so as to create a prepuncturing in the work and to make room within the work for the knotting together of the upper and lower threads.

Austrian Pat. No. 275,291 indicates a heated point passing through the work from its underside, which causes the thermoplast portion of the work to melt in the zone of the subsequent insertion, to make room for the knotting of the upper and lower threads.

Known also from U.S. Pat. No. 3,241,508 is the provision, in the zone of the stitch forming point, of two electrodes, one being arranged above and the other below the work, to destroy the work material in the zone of the needle insertion by the controlled flashover of an electric spark.

Systems of the above mentioned kind are very expensive in their construction and especially for apparatus to effect their control. They require either a heating of the needle tip penetrating into the work dependent on the sewing speed or a control of the spark flashover dependent on the speed of work feed. In sewing machines operating at a speed of only about 3000 rpm, for example, only 20 milliseconds are available for a stitch forming process, and only few milliseconds remain for the prepuncturing to be carried out with the work standing still. Therefore, a control of the electric power for the spark flashover is extremely complicated even when the opening and closing of the circuit of the two electrodes occurs as a function of the rotary movement of the main shaft of the sewing machine. Moreover, due to the fact that in the known systems the creation of the holes is based on a thermal stress on the work material, they have the disadvantage that they can be used primarily or solely for work comprising a predominant amount of thermoplastic components.

SUMMARY OF THE INVENTION

The invention provides a system for the prepuncturing of the work which is not subject to the restrictions of the prior art, and whose output, while avoiding a separate control system for the power transmission, is automatically adaptable to the sewing speed both with respect to its start and with respect to its duration.

According to the invention, perforating tools are employed for prepuncturing the workpiece which is spaced from the needle. The tools include an upper perforating tool which is a rod-shaped tool executing high-frequency longitudinal oscillations and which co-operates with a lower counter-tool movable toward and away from the workpiece on the opposite side thereof and as a function of the speed of work feed. The upper perforating tool continuously executes, above the workpiece, longitudinal osocillations in the high frequency range. A power transmission from the perforating tool to the workpiece occurs only when the workpiece is pressed against the surface of the perforating tool by the counter-tool. If the perforating tool executes its longitudinal oscillations against the workpiece while only loosely coming to bear against the workpiece, or if the workpiece is pressed against a motionless perforating tool by the counter-tool to be applied in the rhythm of the sewing movement, no changes whatever will appear in the work. It follows from this that the perforating process according to the invention amounts to more than a single punching process, but that the perforation is produced by the repeated impingement of the perforating tool executing high-frequency oscillatory movements onto the workpiece which is pressed against the underside of the perforating tool by a counter tool.

A structurally simple system, in which the counter-tool is movable against the perforating tool in a simple manner as a function of the stitch formation, and can be pressed against the work underside or against the perforating tool with a certain initial stress, is obtained by fastening the counter-tool to the base portion of the sewing machine by means of an elastic suspension. This suspension is in drive connection with the main shaft of the machine via a lift drive.

A favorable design with respect to oscillation for the elastic suspension, which at the same time ensures an almost parallel guiding of the counter-tool, includes an elastic suspension in the form of at least two flat springs arranged in spaced relationship one above the other.

To be able to adapt the distance of the counter-tool from the needle in a simple and reliable manner to the different stitch lengths, the suspension of the counter-tool on the base portion is displaceably mounted and applies force-lockingly against an adjusting means which determines the distance between needle and counter-tool.

To obtain a simple shift of the lift of the counter-tool for adapting its starting position to different work thicknesses, the lift drive comprises a ram which is in force-locking engagement with a cam rotatable by the main sewing machine drive. The distance between the cam and the bearing surface for the counter-tool on the ram is adjustable to accommodate the different workpiece thicknesses.

An arrangement of the upper perforating tool which leaves the stitch-forming point visible is obtained by arranging its longitudinal axis so that it extends at an acute angle to the movement path of the needle and the perforating tool is adjustably fastened on the presser foot.

To obtain as low as possible a loss in the onward conduction of the oscillation energy to be supplied to the perforating tool to the work, i.e. to avoid transmission of the oscillation energy to the presser foot carrying the perforating tool, the tool is fastened to the presser foot in the zone of a node and a soft intermediate layer of hard rubber or leather is provided between the tool and the presser foot. In the connecton, it is advantageous to provide the support, which connects the perforating tool with the presser foot at the points coming in contact with the presser foot, with mass accumulations arranged in the direction of the longitudinal oscillations so to impart to it a relatively bending-weak cross-section, and to avoid all transmission of energy to the presser foot.

In arranging the perforating tool at the presser foot the mass of the presser foot is not increased too much, as this will very easily lead, in particular at comparatively high sewing speeds, to an undesirable lifting off of the presser foot from the work and thus to bad stitch-forming as well as bad transport conditions.

A solution taking account of this requirement is obtained by connecting the perforating tool by means of a flexible transmission line to an oscillation source. The length of the connection is an integral multiple of the wave length of the oscillations to be transmitted.

A particularly favorable energy transmission through the flexible transmission results when the transmission comprises a surface which is as smooth as possible, i.e. notch-free, and has a curvature as even as possible. Also the transmission line is advantageously maintained completely tension-free in particular in the lower position of the presser foot, that is, in the operating position of the perforating tool.

Accordingly, it is an object of the invention to provide a workpiece prepuncturing device for use with a sewing machine which has a drive for reciprocating a needle and means for feeding the workpiece into association with the needle and which includes a perforating tool located at a spaced location from the needle which is comparable to a multiple of the stitch length and which also includes a counter-tool arranged on the opposite side of the workpiece which may be moved toward the workpiece for cooperative engagement with the perforating tool during its reciprocation to prepuncture the workpiece and which may be moved away from the workpiece discontinuing the puncturing.

A further object of the invention is to provide a workpiece prepuncturing device for use with a sewing machine to prepuncture the material at regular intervals which will be comparable to the stitch length and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there are illustrated preferred embodiments of the invention.

BRIEF DESCRIPTION OF THE DRAWINGS

In the Drawings:

FIG. 2 is an enlarged partial transverse sectional and partial end elevational view of the sewing machine shown in FIG. 1 but on a large scale;

FIG. 3 is a side elevational view of the prepuncturing tool shown on a large scale;

FIG. 4 is a partial longitudinal sectional view of the counter tool;

GENERAL DESCRIPTION OF THE PREFERRED EMBODIMENTS

Figure 1:
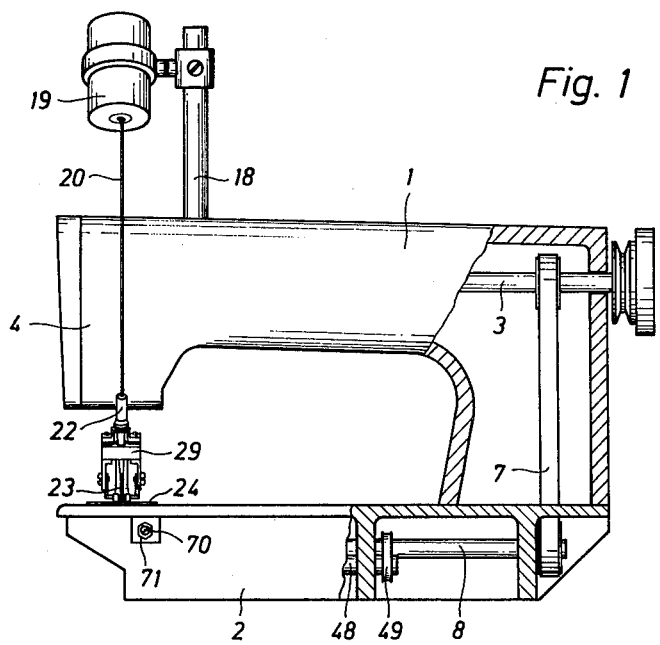
FIG. 1 is a partial side elevational and partial sectional view of a sewing machine constructed in accordance with the invention.

Referring to the drawings, in particular, the invention embodied therein comprises a workpiece prepuncturing device for use with a sewing machine which, as shown in FIG. 1, comprises an arm portion 1 and a base portion 2.

A main sewing machine shaft 3 is mounted in arm 1 and drives a needle-bar 6 which is guided in the head 4 and carries a thread-guiding needle 5 and is in drive connection via a belt drive 7 with a shaft 8 mounted in the base portion 2. From shaft 8 is derived both the drive of the shuttle 9 cooperating with the needle 5 and the drive of the workpiece feed means including a feed plate 10. In the shown embodiment, the feed plate 10 executes a quadrangular movement which is composed of a sliding movement derived from a rocker shaft 11 via a crank 12 and a lifting movement, the lifting movement being derived from the shaft 8 revolving in the ratio 1:1 to the main shaft 3 with interposition of an eccentric 13 and an intermediate member 14. A presser foot 15 cooperates with the feed plate 10, and it is arranged at the lower end of a spring-loaded presser foot 16 and can be brought into an inoperative position by rotation of a handle 17 to move the rod 16 counter to the force of a spring (not shown) pressing it onto the work.

On a support 18 fastened to arm 1 of the machine as shown in FIG. 1, there is adjustably arranged perforating tool drive means in the form of an ultrasonic transformer 19, which serves to transform the electrical oscillations generated by an ultrasonic generator, not shown in detail, and which may be a fully transistorized constant-current generator of an oscillation frequency of about 30 kHz, into mechanical longitudinal oscillations. The ulrasonic transformer 19, whose principle of operation is based on the inversion of the piezo-electric effect, may consist of a piezo-ceramic plate which is prestressed under comparatively high pressure between two aluminum pieces. The ultrasonic transformer 19 has connected to it a transmission line 20 formed of a nickel-copper alloy, for example a monel wire (approximately two parts nickel, one part copper), which carries at its lower end a flange 21. A cap nut 22 engages on a flange 21 and it connects the transmission lines 20 with an upper perforating tool 23. At its end toward the work the perforating tool 23 has a substantially circular cross-section, and its operating surface extends parallel to the work bearing surface formed by the stitch-plate 24.

As can be seen in particular from FIG. 3, the perforating tool 23 has, at its end facing toward the cap nut 22, a U-shaped fastening strap 25 with an accumulation of material 26 being provided at the leg ends bent outwardly; and the two legs, as well as the cross portion of strap 25 having a small bending cross-section in comparison therewith. The strap 25 is connected by means of screws 28 extending through slots 27 with a comparatively massive intermediate piece 29, which for the passage of the perforating tool 23 has a slot-shaped cutout 30 and is fastened to the cross portions of two angular supports 31. To obtain a transmission of the longitudinal vibrations of the perforating tool 23 to the work as loss-free as possible, there is arranged, between strap 25 and intermediate piece 29, a soft intermediate lever 32, which may be formed of hard rubber or leather.

The two supports 31 are fastened to two stays 34 in a manner adjustable by screws 33, the stays being in turn rigidly connected with the sole 35 of the presser foot 15, so that the perforating tool extends into the space present between the two toes 36 of the presser sole 35 in a manner apparent from FIG. 2 and 3. In order that by the attachment of the perforating tool 23 to the presser foot 15 the view toward the stitch-forming point will be impaired as little as possible, the two stays 34 are arranged at the presser foot 15 so that the longitudinal axis of the perforating tool 23 extends at an acute angle to the movement path of the needle 5.

Figure 7:
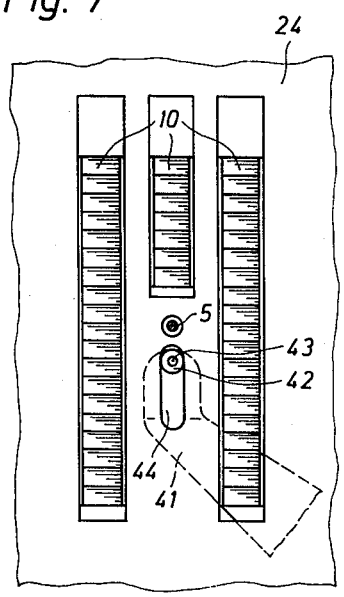
FIG. 7 is a partial top plan of the sewing machine workpiece support.

Cooperating with the upper perforating tool 23 is a counter-tool 40 which is arranged at the front end of a spring yoke 41 and presents a seat 42 for an anvil 43. The anvil 43, whose working surface extends parallel to the working surface of the upper perforating tool 23 and whose cross-section form determines the cross-section form of the holes to be produced in the work, has in the shown embodiment a cylindrical cross-section, but for the purpose of adapting the hole cross-section to the form of the knot to be formed by the upper and lower threads it could have a cross-section form corresponding thereto, for example, a cloverleaf type form. To guide the seat 42 (see FIG. 7) there is provided in the stitch-plate 24 guide slot 44 extending parallel to the feed direction of the feed plate 10.

The spring yoke 41 is connected with counter tool moving means in the form of a lifting drive 45, which is formed essentially by a ram 46 and a cam 47. The cam is received by a shaft 48 mounted in the base portion 2, the shaft is in drive connection with shaft 8 via a toothed belt drive 49 and is driven thereby in the ratio of 1:1.

Figure 5:
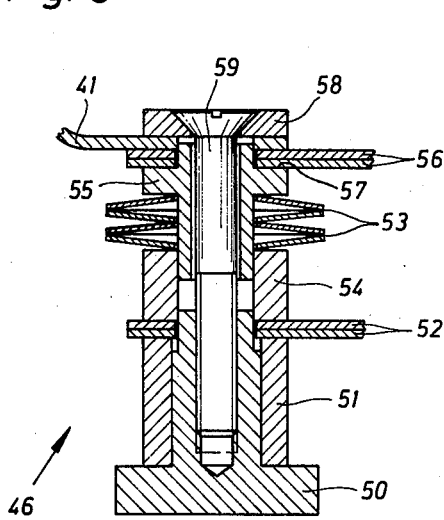
FIG. 5 is an enlarged partial sectional view of the driving ram for the counter tool.

The ram 46, whose detailed design is visible from FIG. 5, comprises an internally threaded ram foot 50 surrounded by a sleeve 51. On the sleeve 51 are fitted two flat springs 52 resting directly one on the other, which are held in engagement with sleeve 51 by means of an intermediate piece 54 loaded by cup springs 53. A spacer 55 is arranged above the cup springs 53 and receives the spring yoke 41 and two additional flat springs 56 which likewise rest directly one on the other. The spacer 55 has an extension forming a bearing surface 57. A disc 58 rests on a spring yoke 41. A screw 59 traversing the spacer 55 and turned into the ram foot 50 is connected with the ram foot, so that by rotation of the screw 59 the distance between the surface of the ram foot 50 coming in engagement with cam 47 and the bearing surface 57 formed by the extension on the spacer 55 for the spring yoke 41 can be varied. Thereby the starting position of the anvil 43 can be varied, so that, despite equal lift of cam 47, the height of emergence of anvil 43 from the stitch-plate 24 can be adapted to the different thicknesses of the work.

Figure 6:
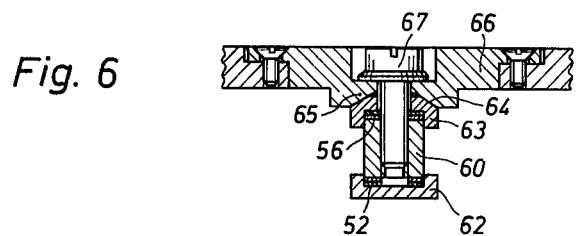
FIG. 6 is a partial sectional view of the spring mounting for the ram.

A supporting piece 60 is arranged between the still free ends of the two flat spring pairs 52, 56, which with interposition of the flat springs 52, 56 is connected by screws 61 with a lower shaped piece 62 and an upper shaped piece 63. As can be seen in this connection from FIG. 6, the shaped piece 63 is provided with two guide faces 64 and is slidable in a counter-guide 65 formed on the underside of an insert 66 fastened in the base portion 2. The supporting piece 60, which is fixable to the insert 66 by a screw 67, and which forms a unit with the two shaped parts 62 and 63 is additionally urged, by a torsion spring 68 surrounding a pin 69 fastened in the insert 66, to the right in respect to FIG. 2, and is thereby held in force-locking contact on an adjusting screw 70 which is screwed into the base portion 2 and secured by a nut 71.

The mode of operation of the system is as follows:

At the beginning of the seam, in accordance with the stitch length set in known manner, the median distance between needle 5 and anvil 43 is adapted to the stitch length by means of the adjusting screw 70. This distance may be an integral multiple of the stitch length including being equal to the stitch length. In the embodiment shown, the adaptation of the distance between needle 5 and anvil 43 to the stitch length is effected by additional actuation of the adjusting screw 70, but alternatively the shifting of the anvil 43 could occur synchronously with the setting of the stitch length.

The distance between the needle and the upper perforating tool 23 is adapted to the set stitch length by displacement of the strap 25 firmly connected with the latter on the intermediate piece 29. This may be done more roughly as compared with the adaptation of the position of anvil 43 to the stitch length, so long as the working surface of the perforating tool 23 of much greater cross-section covers the working surface of anvil 43.

After the work has been guided in known manner between the stitch-plate 24 and the sole 35 of the presser foot 15, the generator is connected to voltage. In the ultrasonic transformer 19 the electric oscillations generated by the generator are transformed into longitudinal oscillations and transmitted via the transmission line 20 to the upper perforating tool 23. The perforating tool 23, which is to be regarded as a sonotrode, thus executes high-frequency longitudinal oscillations whose amplitude is in the order of magnitude of 20 to 50 $\mu$. With the machine still standing still, the perforating tool 23 thus executes, lying on the work of just above it, high-frequency longitudinal oscillations which, since the work is readily able to yield downwardly by a multiple of the amplitude of these oscillations, remain completely without effect on the work.

During the formation of the seam, that is, while the feed plate 10 moves the work in feed direction, shaft 48 in operative connection with shaft 8 via the belt drive 49 is driven, with the result that ram 46 executes one lift movement per stitch-forming process. Cam 47 is designed or arranged with respect to its phase position on shaft 48 so that anvil 43 reaches its highest position when the feed plate 10 starts to fix the work in the course of its lift movement. During the time in which the feed plate 10 executes the rest of its lift, anvil 43 occupies its highest position, which corresponds to its operative position, in which it presses the work against the swinging upper perforating tool 23 from below. By the continual impingement of the perforating tool on the work during this time interval the work material is destroyed and a hole corresponding to the cross-section form of anvil 43 is formed therein which has distance from the needle 5 equalling the stitch length. As soon as the feed plate 10 has completed its lifting movement and it therefore begins its shifting movement, anvil 43 moves downward. The uninterruptedly swinging perforating tool 23 continues, of course, to impinge on the work during the feed movement of the feed plate 10, but since the anvil 43 is retracted, the work can yield downwardly, so that a perforation is not again formed in the work until the anvil 43 is raised again in the course of the next following stitch-forming process. Therefore, although the upper perforating tool 23 executes longitudinal oscillations in the high-frequency range during the entire sewing operation and continually impinges on the work, a perforation is produced by this impinging in the work only when the workpiece is pressed against the underside of the perforating tool 23 by the anvil 43 when it is moved into its high position.

In the embodiment shown, the perforating tool 23 executing the high-frequency longitudinal oscillations is arranged above the work, while the counter-tool 40 is below the work. This arrangement does not interfere materially with the operation of the stitch-forming point and moreover has the advantage that the lift movement of the counter tool 40 can be derived in simple manner by the shaft 8 anyway. At variance from this arrangement, it is of course possible to locate the perforating tool 23 in the base portion 2 and the counter tool 40 in the head 4 of the sewing machine.

While specific embodiments of the invention have been shown and described in detail to illustrate the application of the principles of the invention, it will be understood that the invention may be embodied otherwise without departing from such principles.

What is claimed is:

1. A sewing machine construction comprising a base portion, an arm portion overlying said base portion, a needle mounted in said arm portion for reciprocation over said base portion, a main sewing machine shaft rotatably mounted in said base portion, a workpiece advance plate connected to said shaft for movement by said shaft during rotation thereof in timed relationship to the movement of said needle and being connected to said needle to drive said needle in reciprocation, an insert slide on said base portion, a mounting member mounted for adjustable movement along said slide, a resilient support connected to said member, a ram carried by said resilient member, a rotatable cam driven by said main shaft and engageable with said ram to raise and lower said ram, a perforating tool mounted on said base portion, said base portion having a slot through which said tool reciprocates, a counter tool carried on said ram and being movable with said ram toward and away from the workpiece at the location of said slot for cooperative engagement with said perforating tool.

2. A sewing machine according to claim 1, including an adjustment means connected to said slide for adjusting the position of said slide to vary the position of said counter tool in accordance with the length of stitch.

3. A sewing machine according to claim 1, wherein said base portion has a stitch plate having a guide slot therein extending parallel to the work feed direction, said counter tool being engageable in said guide slot.

4. A sewing machine according to claim 1, including adjustment means engageable with said slide for moving said slide in one direction, and spring means urging said slide against said adjustment means.

5. A sewing machine according to claim 1, wherein the longitudinal axis of said perforating tool extends at an acute angle to the movement of said needle, a presser foot carried by said arm portion cooperatively engageable with the workpiece alongside said needle, said perforating tool being mounted on said presser foot.

6. A sewing machine according to claim 3, wherein the perforating tool is arranged on the presser foot in the zone of an oscillation node between it and the presser foot and means mounting said perforating tool with an intermediate resilient material later providing a resilient mounting for said tool.

7. A sewing machine according to claim 1, wherein said perforating tool reciprocating means comprises an oscillation source, a flexible transmission line connected between said oscillation source and said tool which has a length equal to an integral multiple of the amplitude of the oscillations to be transmitted.

8. A system on sewing machines for prepuncturing the work with perforating tools arranged before the needle in a work feed direction at a spacing from the needle which is an integral multiple of the stitch length, comprising a perforating tool of a rod-shaped configuration, tool drive means connected to said tool to cause it to execute high frequency longitudinal oscillations in contact with the workpiece, a counter tool movable toward and away from the opposite side of the workpiece from said tool, and counter tool drive means connected to said counter tool to move it during the period of perforating tool oscillation at a speed in proportion to the speed of advance of said workpiece to effect the perforation of the workpiece.

9. A workpiece prepuncturing device for use with a sewing machine having a drive for reciprocating a needle and means for feeding a workpiece into association with the needle to sew a stitch, comprising a perforating tool located at a spaced location from the needle which is comparable to a multiple of the stitch length, means mounting said perforation tool for engagement with the workpiece, tool drive means connected to said tool for reciprocating said tool at high frequency into and out of engagement with the workpiece, a counter tool on the opposite side of the workpiece from said perforating tool, and means for moving said counter tool toward and away from the workpiece during the period of perforating tool oscillation in timed relationship to the means for reciprocating the needle and feeding the workpiece to effect the perforation of the workpiece.

10. A system on sewing machines for prepuncturing the work with perforating tools arranged before the needle in a work feed direction at a spacing from the needle which is an integral multiple of the stitch length, comprising a perforating tool of a rod-shaped configuration, tool drive means connected to said tool to cause it to execute high frequency longitudinal oscillations, a counter tool movable against the opposite side of the workpiece from said tool, counter tool drive means connected to said counter tool to move it at a speed in proportion to the speed of advance of said workpiece, a sewing machine with a base portion, an elastic suspension mounted in said base portion and connected to said counter tool, a main shaft for reciprocating the needle and feeding the workpiece located in said sewing machine and a lift drive connected to said elastic suspension for periodically lifting said suspension with the counter tool so as to periodically position the counter tool in opposition to the perforating tool and to effect the puncturing of the workpiece.

11. A workpiece prepuncturing device, according to claim 10, wherein said elastic suspension comprises a mounting member, at least two flat springs connected to said mounting member and disposed one above the other and being connected to said counter tool.

* * * * *